March 5, 1935.  P. M. LINCOLN  1,993,374
INTEGRATING ATTACHMENT FOR A THERMAL METER
Filed April 6, 1933
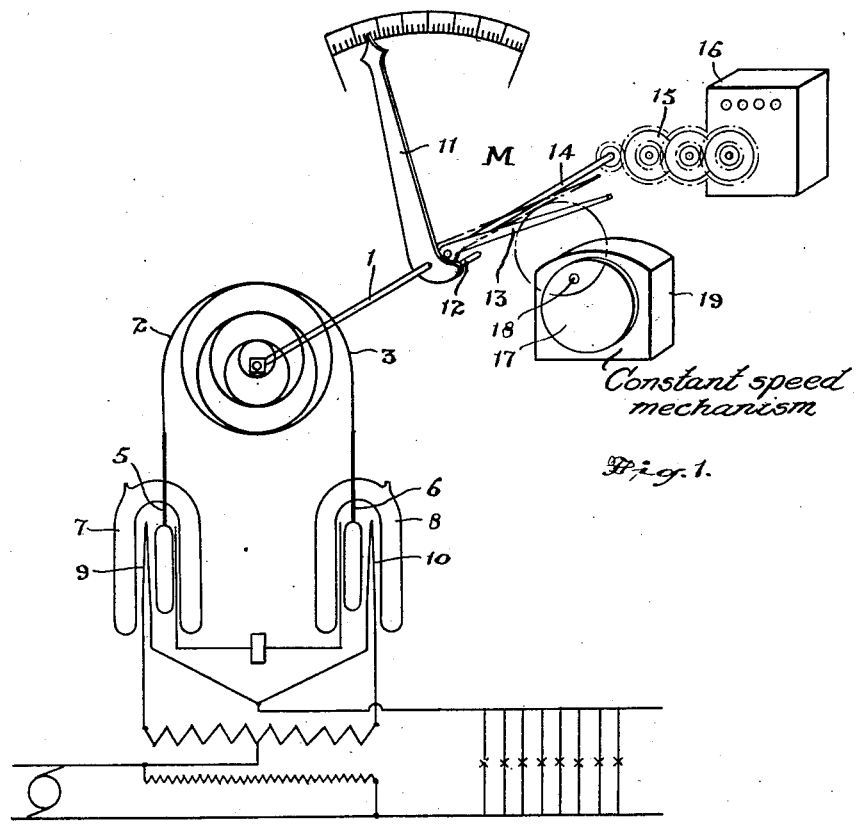
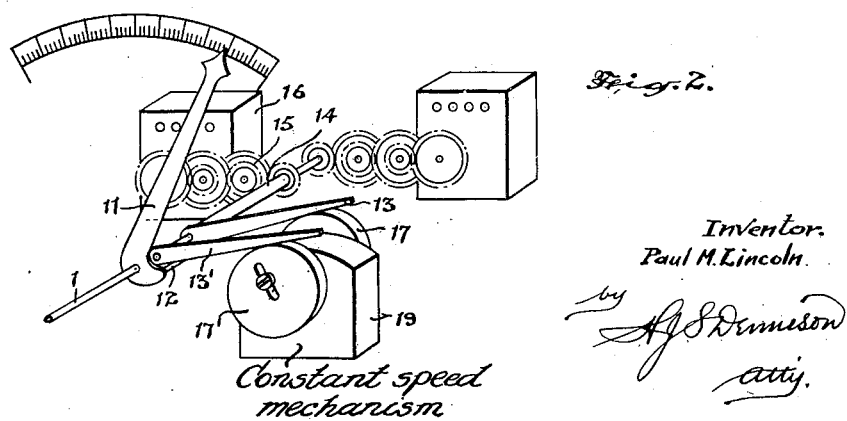
Inventor.
Paul M. Lincoln.

Patented Mar. 5, 1935

1,993,374

UNITED STATES PATENT OFFICE 1,993,374

INTEGRATING ATTACHMENT FOR A THERMAL METER

Paul M. Lincoln, Ithaca, N. Y.

Application April 6, 1933, Serial No. 664,782

9 Claims. (Cl. 171—270)

The principal objects of this invention are to provide a meter which will accurately measure K. W. hours of energy and K. W. of demand and which will be extremely simple in construction and will be very reliable and comparatively free from operating troubles.

The principal feature of the invention consists in the novel application of a timing device to a thermal demand meter whereby the demand measurement is recorded automatically at regular intervals producing a true measurement of K. W. hours.

In the drawing Figure 1 is a diagrammatic illustration of an apparatus for carrying this invention into effect.

Figure 2 is a diagrammatic view of a modification of the timing device.

It has been adequately demonstrated that synchronous motors have been developed to a state of extreme accuracy and the present invention proposes the use of such a timing device in conjunction with an accurately operating thermal demand meter but it must be understood that other forms of timing devices may be used in carrying my invention into effect.

The basis of this invention depends upon the principle that if any watt meter is read at regular intervals and the readings are continuously added, the sum thus obtained will be a true measurement of K. W. hours. With the thermal meter, which is of the slow responding type, the summation of the readings at regular intervals, say once a minute, will be an absolutely accurate record independent of the most violent load fluctuations. This result follows from the fact that a thermal watt meter does not read the instantaneous watts but, at any instant, reads the "logarithmic average" over the period for which the meter is designed.

In the application of this invention illustrated by the accompanying diagrams the meter M is such as is provided with a spindle 1 which is operated by a pair of helical "Bourdon" tubes 2 and 3 arranged in opposed relation. These operating elements are connected with heat responsive elements 5 and 6 enclosed within vacuum receptacles 7 and 8 and are subject to the influence of the heating elements 9 and 10 connected with the load circuit in a manner which is well known and requires no detailed description. The pointer 11 mounted on the spindle 1 of the thermal meter M is here shown provided with a lug or spur 12 which engages and supports an arm 13 which is loosely mounted to rotate about the same axis as the pointer 11. A spindle 14 is connected preferably by a one-way clutch device of a suitable design, to the arm 13 and the spindle 14 is operatively connected to a train of gears 15 connected with a suitable recording device 16, such gears and recording device being similar to those used in the ordinary type of rotating integrating meter.

A cam 17 is secured upon a spindle 18 operated by a synchronous motor 19, or other suitable timing device and it is rotated in an eccentric movement at regular periods, say once a minute, similar to the movement of the second hand of a synchronous electric clock, and it engages the arm 13 raising it at each revolution, and rotating the recording spindle 14 to operate the train of gears and the recording device connected therewith.

The arm 13 swings freely on its pivot and resting on the projecting spur 12, it follows the pointer 11 in one direction in its indicating movement without rotating the gear train, and at each rotation of the cam 17 it is carried back to its zero position being rotated through an angle equal to the then reading of the pointer 11. These periodic excursions of the arm 13 are recorded through the gear train and an accurate record of energy is recorded while the indication of demand is registered by the arm 11.

The device illustrated diagrammatically in Figure 1 may, by a slight alteration as illustrated in Figure 2, be readily adapted to the measurement of excess K. W. hours as well as total K. W. hours, excess K. W. hours meaning the K. W. hours of energy in excess of a given value for which the meter is set. As illustrated in Figure 2 the cam member 17' operated by the timing device 19 is capable of adjustment and engages a second arm 13' and it is so adjusted that instead of carrying the arm 13' back to the zero position it carries said arm back to any desired position short of zero. As an example, if the cam 17' is set so that its maximum movement will only carry the arm 13' back to a 50% scale position, a gear train connected with the arm 13' will register only the K. W. hours used that are in excess of 50% of the full scale.

It will be readily appreciated that additional cams, arms and gear trains can be provided to measure the excess above additional scale points to any extent desired.

The use of a device such as described has hitherto been prohibitive owing to the errors which have prevailed in the known types of thermal meters and while the present invention has been shown applied to a new construction of thermal meter it must be understood that the invention may be applied to any thermal meter which will operate with sufficient accuracy to produce a true reading.

What I claim as my invention is:—

1. An integrating attachment for a meter, comprising a member adapted to be positioned by the meter, a second member freely displaceable in one direction in accordance with the displacement of the aforesaid member, registering means associated with said second mentioned member and unaffected by the above displacement thereof, and a constant speed mechanism imparting a positive return movement to said second mentioned member independent of the first mentioned member, said second-mentioned member having a driving connection with said registering means during its return movement only, whereby the meter is relieved entirely of the function of operating the registering means.

2. An integrating attachment for a thermal meter comprising a member to be positioned by the thermal meter, a stop member positioned thereby, a follower member adapted to rest on said stop, registering means actuated by said follower member only during movement away from said stop, and a constant speed mechanism periodically moving said follower away from said stop and returning the same to the stop, whereby the meter is relieved entirely of the function of operating the registering means.

3. An integrating attachment for a thermal type meter, comprising a member to be displaced by said thermal meter, a stop member positioned by said member, a cam driven at a constant speed, an arm disposed in the path of the cam and permitted during a part of the cam revolution to rest by gravitational action on said stop, said cam effecting the positive displacement of said arm from the stop to a zero position independent of the meter displaced member during the other part of its revolution, and a registering means operatively connected with said arm during the latter movement only, thereby relieving the meter of the function of driving the registering means.

4. An integrating attachment for a thermal type meter comprising a stop member to be positioned by said thermal meter, a pair of registering devices, a pair of operating members respectively associated with said registering devices, cam members associated with said pair of members and operating at a constant speed, one of said cams co-operating with one of said members to permit the same to engage the stop regardless of the position of the latter and to thereafter return the same to a zero position, the other cam co-operating with the other of said pair of members to permit the same to engage the stop members and thereafter return the same to a predetermined position short of zero.

5. In a device of the kind described a plurality of registering devices, an operating spindle extending from each of said devices, arms connected respectively with said spindles each through a one way clutch, stop means adapted to be variably displaced and limiting the free movement of said arms in one direction, said stop means including a member displaced by one of said arms and engaged in positioning contact by the other arm, and a plurality of constant speed cam members engaging said respective arms to return the same predetermined distances, at least one of said cams being engageable with its respective arm only after a predetermined displacement of said other arm and the stop member displaced thereby.

6. In a device of the class described, a plurality of individual recording devices, each of said registering devices having an operating member extending therefrom, means for positioning said operating members relative to a predetermined position and a plurality of constant speed cams each co-operating with a separate one of said operating members to periodically return the same to said predetermined position, at least one of said cams being capable of adjustment to vary its displacement and to vary the degree of return movement of the means actuated thereby.

7. A device as claimed in claim 6 in which the operating members of said registering devices comprise concentrically mounted and relatively rotatable spindles each having a radial arm and said cams are mounted on a common shaft with the radial arms adapted to rest thereon to a degree determined by the position of said positioning means.

8. An integrating attachment for meters, comprising in combination a member to be positioned by the meter, a stop member positioned by said member, a second member freely displaceable in one direction in accordance with the displacement of the aforesaid member, registering means associated with said second-mentioned member and unaffected by the above displacement thereof, and a constant speed mechanism co-operating periodically with the second-mentioned member to first permit same to engage the stop member and thereafter effect the positive return of the second-mentioned member to its zero position, said second-mentioned member having a driving connection with said registering means during its return movement only.

9. An integrating attachment for a thermal type meter, comprising a member to be displaced by said thermal meter, a stop member positioned by said member, a cam driven at a constant speed, a displaceable arm disposed in the path of the cam and permitted during a part of the cam revolution to rest on said stop, said cam effecting the positive displacement of said arm from the stop to the zero position independent of the meter displaced member during the other part of its revolution, said initially displaced member and said arm being disposed respectively on separate but axially aligned axes and the arm being moved by gravity to follow the cam member while advancing toward the stop member, and registering means operatively connected with said arm during the return movement.

PAUL M. LINCOLN.